US008868588B2

(12) United States Patent
Mascarenhas et al.

(10) Patent No.: US 8,868,588 B2
(45) Date of Patent: Oct. 21, 2014

(54) SYSTEM AND METHOD FOR PROVIDING A COMPOSITE VIEW OBJECT AND SQL BYPASS IN A BUSINESS INTELLIGENCE SERVER

(75) Inventors: Alextair Mascarenhas, Foster City, CA (US); Harvard Pan, Boston, MA (US); Kenneth Eng, Belmont, CA (US); Raghuram Venkatasubramanian, Cupertino, CA (US); Roger Bolsius, Round Rock, TX (US)

(73) Assignee: Oracle International Corporation, Redwood Shores, CA (US)

( * ) Notice: Subject to any disclaimer, the term of this patent is extended or adjusted under 35 U.S.C. 154(b) by 407 days.

(21) Appl. No.: 13/100,263

(22) Filed: May 3, 2011

(65) Prior Publication Data

US 2011/0295882 A1   Dec. 1, 2011

Related U.S. Application Data

(60) Provisional application No. 61/349,127, filed on May 27, 2010.

(51) Int. Cl.
*G06F 7/00* (2006.01)
*G06F 17/30* (2006.01)

(52) U.S. Cl.
CPC ............................ *G06F 17/30427* (2013.01)
USPC .................................................. 707/760

(58) Field of Classification Search
CPC .................... G06F 17/3097; G06F 17/30427
USPC ................. 707/600, 999.01, 760, 999.004
See application file for complete search history.

(56) References Cited

U.S. PATENT DOCUMENTS

| | | | |
|---|---|---|---|
| 7,971,148 B2 * | 6/2011 | Papakonstantinou et al. | 715/762 |
| 8,010,376 B2 * | 8/2011 | Buchmann et al. | 705/1.1 |
| 8,214,379 B2 * | 7/2012 | Williams et al. | 707/758 |
| 2005/0033726 A1 * | 2/2005 | Wu et al. | 707/1 |
| 2007/0255741 A1 * | 11/2007 | Geiger et al. | 707/101 |
| 2009/0006411 A1 * | 1/2009 | Lele et al. | 707/9 |
| 2009/0271158 A1 * | 10/2009 | Yeh et al. | 703/2 |
| 2010/0169351 A1 * | 7/2010 | Kulkarni et al. | 707/759 |
| 2010/0198830 A1 * | 8/2010 | Stewart et al. | 707/741 |
| 2011/0246549 A1 * | 10/2011 | Katzenberger et al. | 709/201 |

OTHER PUBLICATIONS

Pankowski, "Query Propagation in a P2P Data Integration System in the Presence of Schema Constraints", 2008, Springer-Verlag Berlin, Globe '08 Proceedings of the 1st international conference on Data Management in Grid and Peer-to-Peer Systems, pp. 46-57.*

(Continued)

*Primary Examiner* — Brannon W Smith
(74) *Attorney, Agent, or Firm* — Meyer IP Law Group (57) ABSTRACT

Systems and methods are described for performing a SQL bypass in a business intelligence (BI) server environment. The BI server initially receives a SQL query and constructs an extensible markup language (XML) representation of the SQL query. The XML representation is sent to an application server that hosts an application developer framework (ADF). The ADF receives the XML representation of the SQL query and constructs a composite view object at runtime, to access the appropriate data. It then generates a database-specific query based on the composite view object and returns it to the BI server. The BI server replans the database-specific query and sends it to a database storing the data.

20 Claims, 6 Drawing Sheets

(56) References Cited

OTHER PUBLICATIONS

Loscio et al, "Query reformulation for an XML-based data integration system", 2006, ACM New York, NY, USA, SAC '06 Proceedings of the 2006 ACM symposium on Applied computing, pp. 498-502.*

Baranovskis, Andrejus, "Using #{row.rowKeyStr} property with Composite View Object", Aug. 18, 2007.*

Oak, "Oracle JDeveloper 10g: Empowering J2EE Development", Chapter 7, 2004.*

Zhou, "Efficient Exploitation of Similar Subexpressions for Query Processing", 2007.*

* cited by examiner

LOGICAL QUERY select

"Dim Business Unit"."BUName",

"Fact Receipts"."TotalAmount"

from

"3.MasterDetail"

where

"Dim Business Unit"."BUName" = 'Vision Operations'

SQL BYPASS QUERY

```
WITH
SAWITH0 AS (select T11943.C102001327 as c1, T11943.C221604829
as c2
from
    (SELECT V531387417.CASH_RECEIPT_ID AS C177660993,
V90279078.BU_ID AS C414095648, V90279078.BU_NAME AS
C102001327,     V531387417.AMOUNT AS C221604829 FROM
(SELECT * FROM AR_CASH_RECEIPTS_ALL) V531387417, (SELECT
* FROM FUN_ALL_BUSINESS_UNITS_V) V90279078 WHERE
V531387417.ORG_ID = V90279078.BU_ID(+) AND ( (
(V90279078.BU_NAME LIKE 'Vision Operations') ) )) T11943)
select
    D1.c1 as c1,
    sum(D1.c2) as c2
from
    SAWITH0 D1
group by D1.c1
order by c1
```

*SQL returned by CompositeVO* — 506

XML QUERY TO BROKER

```xml
<?xml version="1.0" encoding="iso-8859-1" standalone="yes"?>
<ADFQuery>
<Projection>
    <Attribute><Name><![CDATA[BuName]]></Name><ViewObject
><![CDATA[MasterDetailAM.BusinessUnitVO1]]></ViewObject></Attribut
e>
    <Attribute><Name><![CDATA[Amount]]></Name><ViewObject
><![CDATA[MasterDetailAM.ReceiptHeaderVO1]]></ViewObject></Attrib
ute>
</Projection>
<JoinSpec>
    <ViewObject>
        <Name><![CDATA[MasterDetailAM.BusinessUnitVO1]]></Nam
e><PrimaryKey><Attribute><![CDATA[BuId]]></Attribute></PrimaryKey>
        <ViewLink><Name><![CDATA[MasterDetailAM.RecHeaderToB
usinessUnitVL1]]></Name></ViewLink>    </ViewObject>
    <ViewObject>
        <Name><![CDATA[MasterDetailAM.ReceiptHeaderVO1]]></Na
me><PrimaryKey><Attribute><![CDATA[CashReceiptId]]></Attribute></P
rimaryKey>
        <ViewLink><Name><![CDATA[MasterDetailAM.RecHeaderToR
ecAppVL1]]></Name></ViewLink>
        <ViewLink><Name><![CDATA[MasterDetailAM.RecHeaderToL
edgerVL1]]></Name></ViewLink>
        <ViewLink><Name><![CDATA[MasterDetailAM.RecHeaderToB
usinessUnitVL1]]></Name></ViewLink>
    </ViewObject>
</JoinSpec>
<DetailFilter>
    <ViewCriteria>
        <ViewCriteriaRow><Attribute><ViewObject><![CDATA[MasterD
etailAM.BusinessUnitVO1]]></ViewObject><Name><![CDATA[BuName]]
></Name></Attribute><Predicate><![CDATA[Vision
Operations]]></Predicate></ViewCriteriaRow>
    </ViewCriteria>
</DetailFilter>
</ADFQuery>
```

SYSTEM AND METHOD FOR PROVIDING A COMPOSITE VIEW OBJECT AND SQL BYPASS IN A BUSINESS INTELLIGENCE SERVER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to business intelligence and in particular to efficiently accessing data by utilizing a business intelligence server.

BACKGROUND

In recent years, business intelligence tools have become increasingly utilized by large business enterprises and other organizations. Business intelligence provides current and historical views of business operations by analyzing internal, structured data and business processes of the organization. It is often used to create future models and predictions in order to support better business decision making. As such, business intelligence tools can lead to decreased costs and increased efficiency, productivity and profit margins for many companies.

Business intelligence is usually implemented as software and/or hardware tools that are used to collect and analyze data and to transform the raw data into meaningful and useful information used to enable more effective strategic, tactical, and operational insights and decision-making. As such, a typical business intelligence server relies on data that may reside in a variety of places, including but not limited to databases, repositories, content management systems, application servers, software development frameworks and many other sources.

In a typical business intelligence server, data is collected from all (or some) of these sources and placed into a (virtual or physical) data warehouse or data mart, where it can then be modeled and analyzed before being presented to the user. For example, in the context of collecting data from an application development framework (ADF) source, one approach is to implement a physical layer within the business intelligence server, where data is modeled as a consolidated table that mirrors objects in the ADF layer. An application developer can assemble these compound objects by hand, using a subset of the entities relevant to the domain; the synthesized objects can subsequently be imported into the business intelligence server's metadata and decomposed into dimensions and facts.

However, this composition is usually a manual effort, often requires domain experts, and can be prone to errors in model translation. Another problem arises from having to decide at design-time what the composition should be. Involving all the possible columns of interest can lead to model bloat. Queries against such large objects will accordingly take longer to execute since many unneeded joins are introduced in the execution. On the other hand, limiting what is composed into the consolidated object reduces the flexibility of ad-hoc querying.

An alternative to using compound objects is to retain the original architectural separation and use the constituent objects as defined in the ADF source model. However, this also requires the business intelligence server to model the linkages between these objects. These links can be sufficiently complex that remodeling them in the business intelligence layer is just another variant of the model translation issue.

Additionally, from a performance perspective, since the data sources often do not support aggregation, such queries tend to be slow because aggregations are performed on low level data in business intelligence server. Potentially going through additional servers (e.g. Java Host and ADF) in the network is slower than directly querying the database.

SUMMARY OF INVENTION

In various embodiments, systems and methods are described for allowing a business intelligence (BI) server to perform a structured query language (SQL) bypass when accessing data over an application developer framework (ADF). In addition, the various embodiments provide a runtime composite view object (VO) at the application developer framework (ADF) that can be used by a query to reference multiple view objects in the ADF layer.

In accordance with an embodiment, the BI server initially receives a SQL query and constructs an extensible markup language (XML) representation of the SQL query. The XML representation is sent to an application server that hosts an application developer framework (ADF). The ADF receives the XML representation of the SQL query and constructs a composite view object at runtime, to access the appropriate data. It then generates a database-specific query based on the composite view object and returns the query to the BI server. The BI server re-plans the database-specific query and sends it to a database storing the data.

BRIEF DESCRIPTION OF THE DRAWINGS

FIG. 5 is an example of a logical query, an XML message to the ADF containing the query and the SQL bypass query, in accordance with various embodiments of the invention.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments of the invention, a structured query language (SQL) bypass and composite view object features are enabled in a business intelligence (BI) server. In accordance with an embodiment, when the BI server receives a SQL query that accesses multiple objects in an application server, the BI server can determine whether to perform an SQL bypass. If the BI server determines to perform an SQL bypass, it sends a representation (XML) of the query to the application server hosting the ADF, which creates a composite view object at runtime to access the data. The ADF then provides a database-specific query to the BI server, and the BI server can re-plan the database-specific query and invoke the re-planned query directly against the database.

Alternatively, the BI server can transmit a representation XML of the query to the application server, which can in turn execute the query against the database. A composite view object can still be created on the application server at runtime to reflect the data accessed by the SQL query. This composite view object enables the BI server to model multiple objects or entities in the application server, without having to declare and create it beforehand at design time.

The above embodiments of the present application enable a plurality of forms of business analytics within a set of applications. These analytics cover:

Ability of the business intelligence (BI) server to query a java based (J2EE) application as a data source;

Ability to express a query against a service, have the service generate a SQL statement (that includes session context, user security around data etc), generate an improved plan around this SQL statement to further function ship computations and send it to the underlying database for performance gains;

Ability to write-back data through the business intelligence (BI) server frontend while respecting the business logic defined in the application layer;

Ability to facilitate a SQL endpoint on top of a Java based application to empower SQL based tools and data movement (ETL tools) strategies; and Ability to blend the various application concepts (setid, DFF, KFF, effective dates, lookup etc.) to their corresponding BI counterpart to offer a cohesive overall usage model to consumers.

Figure 1:
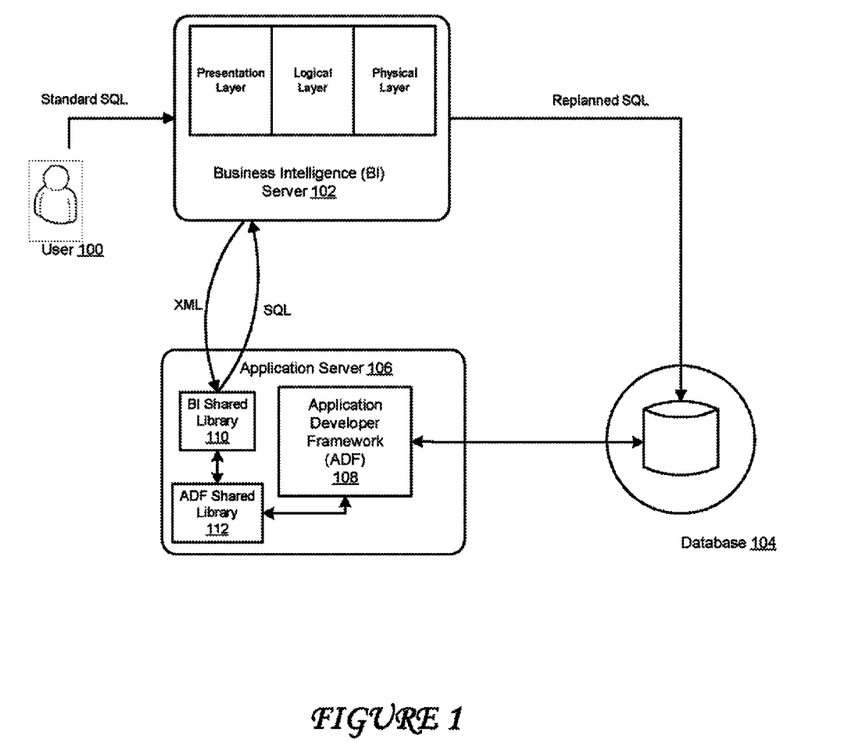
FIG. 1 is an illustration of the BI server accessing data using SQL bypass, in accordance with various embodiments of the invention.

FIG. 1 is an illustration of the BI server accessing data using SQL bypass, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a user 100 can submit a SQL query to a business intelligence (BI) server 102. In accordance with an embodiment, the BI server 102 can be comprised of a presentation layer, a logical layer and a physical layer. The physical layer can map one-to-one to the view objects in the application developer framework (ADF) 108. The logical layer can logically arrange those objects and perform the needed database table joins to reflect the business intelligence views of the entities in the ADF. Finally, the presentation layer allows users to access BI functionality, generate reports, provide security, and the like.

In the illustration, once the BI server 102 receives the SQL query from the user, it can convert it into an extensible markup language (XML) representation and transmit the XML document to the application server 106 hosting the ADF 108. In accordance with an embodiment, a BI shared library 110 can be deployed on the application server to allow the BI server to communicate with the ADF 108 and to allow the BI server to access the application programming interface (API) of the ADF via the ADF shared library 112.

Continuing with the illustration, once the ADF receives the XML data, it can generate the database-specific query and return the query to the BI server. In accordance with an embodiment, the BI server then re-plans the query and issues it against the database 104.

In this manner, the BI server can access Java and J2EE based applications as a data source. Additionally, the BI server can utilize the ADF to construct database-specific queries by invoking the APIs published by the ADF, while at the same time being able to invoke computations performed within the database. In accordance with an embodiment, the SQL bypass enables the BI server to invoke functionality to perform certain computations within the database, rather than stream all of the relevant data back to the server and then perform the computations on the actual server. For example, if the request includes a summation query, rather than streaming a massive amount of results from the database and then computing the results at the server, the BI server is enabled to re-plan the query and invoke the summation on the database end. In this manner, an improvement in performance is achieved due the reduction in results being transmitted back to the BI server.

Figure 2:
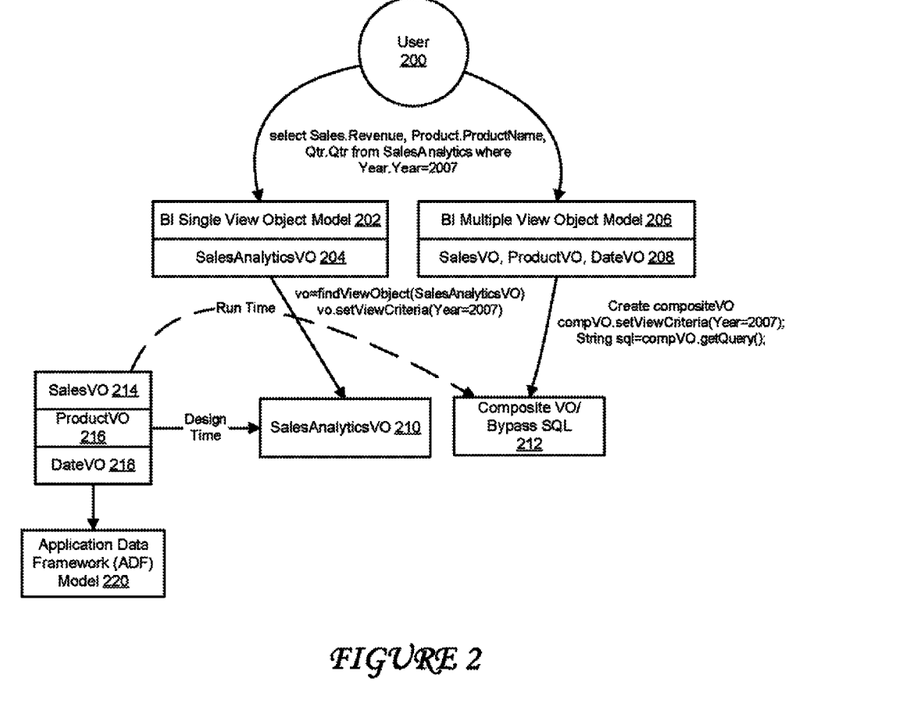
FIG. 2 is an illustration of the composite view object functionality, in accordance with various embodiments of the invention.

FIG. 2 is an illustration of the composite view object functionality, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In this illustration, a composite (multiple) view object (VO) model 206 is shown in comparison to the single view object model 202. In the single VO model 202, the physical layer of the BI server metadata models a consolidated table (SalesAnalyticsVO 210) that is associated with the respective entities in the ADF layer 220. The application developer assembles this VO by hand using a subset of the entity objects (214, 216, 218) relevant to the domain. The synthesized VO is subsequently imported into the BI metadata 204 and decomposed into dimensions and facts.

This composition is usually a manual effort, requires a domain expert and can be prone to possible errors in model translation. Another problem may arise from having to decide at design time what the composition should be. Involving all possible columns of interest can lead to model bloat. Queries against such large VO will accordingly take longer to execute since many unneeded joins are introduced in execution.

In the composite VO model 206, a set of new extensions is incorporated into the ADF API that allow the automatic creation of a runtime composite VO 212 or the generation of an equivalent SQL bypass query that incorporates the projection columns, filters and joins required by the BI query. Thus, rather than having to decide at design time which data fields and information will be useful and designing the appropriate view objects, the API now enables a user 200 to create a runtime composite object 212 based on the query and the filters contained in it, wherein the composite VO object can be used to model the object constituents into the BI server metadata 208.

Figure 3:
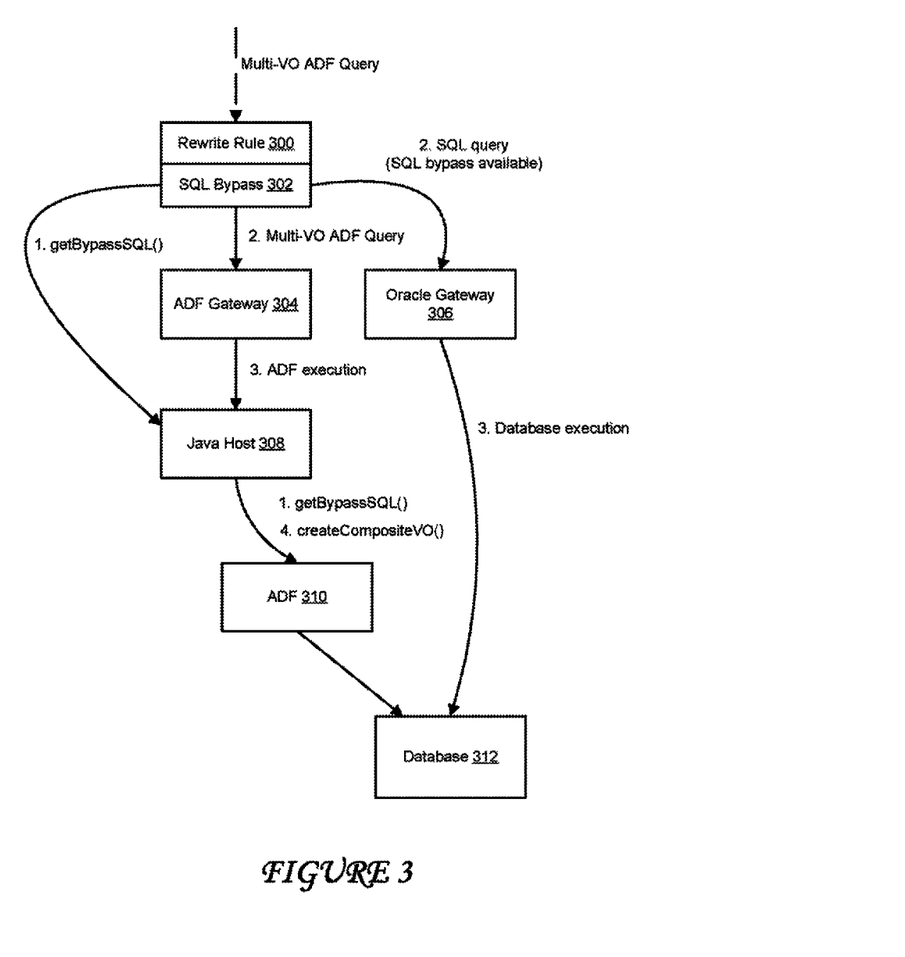
FIG. 3 is an illustration of the composite view object and bypass SQL functionality, in accordance with various embodiments of the invention.

FIG. 3 is an illustration of the composite view object and bypass SQL functionality, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

This illustration represents the transformations a query can go through. The SQL Bypass rewrite rule 300 first checks with the ADF layer if a bypass SQL query 302 is available. If it is available, the query is rewritten, remarked, re-planned (to push down aggregations), and executed directly against the database 312 via the gateway (e.g. Oracle gateway 306). If no bypass SQL is available, the multi-VO join graph is sent down to Java Host 308 via the ADF gateway 304, where the composite VO is created and immediately executed on the ADF 310. In the BI server code, this rewrite can be done using a rewrite rule in the scheduler or request generator component.

In accordance with various embodiments, the SQL bypass functionality can be enabled or disabled by an administrator or other user of the BI server. It should also be noted, that the gateways 306, 304, as well as other components in this figure are not necessary to all embodiments of the invention and are shown for illustration purposes only. Other embodiments will include a lesser or greater number of components, within the scope of the present disclosure.

In the business intelligence server metadata, multiple VOs can be modeled as separate BI physical tables which are connected with dummy complex joins. In accordance with an embodiment, these joins serve only to represent the view links in the ADF model and need not necessarily be executed by the BI server. Instead, they can be used to check that a query is legal; i.e. a query can only span VOs that are linked.

Figure 4:
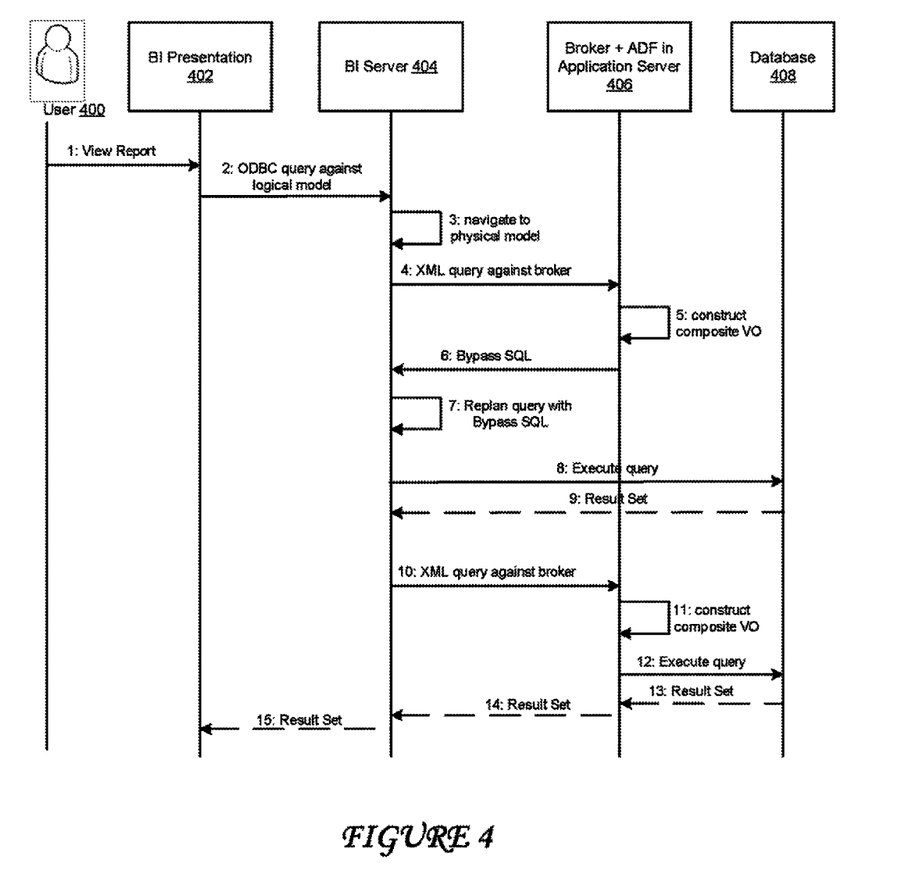
FIG. 4 is a flow chart diagram of performing an SQL bypass and generating composite VO object, in accordance with various embodiments of the invention.

FIG. 4 is a flow chart diagram of performing an SQL bypass and generating composite VO object, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated, a user 400 can request a set of information (e.g. "view report") from the business intelligence presentation layer 402. The BI presentation layer can relay the request as an Open Database Connectivity (ODBC) query against the logical model of the BI server 404. The BI server can navigate to the physical model and issue a query as an extensible markup language (XML) message to the application server, or any broker that enables a connection thereto. The ADF layer on the application server 406 can then create a composite view object (VO) and generate a Bypass SQL statement, which it returns to the BI server 404. The BI server 404 can then replan the query using the bypass SQL statement and execute it directly against the database 408 for improved performance. The database can then return the result set directly to the BI server.

In addition to the process described above (or alternatively), the ADF 406 can execute the query for the BI server without using the Bypass SQL feature. For example, once the BI server 404 issues an XML query against the ADF, the ADF can generate a composite VO and execute the query against the database. Once the database returns the result set to the ADF, it can forward the result set to the BI server and its presentation layer.

FIG. 5 is an example of a logical query, an XML message to the ADF containing the query and the SQL bypass query, in accordance with various embodiments of the invention. It is noted that although this figure illustrates particular query statements and formats, none of these formats or statements are intended to the limiting on the disclosure as a whole. It will be apparent to one of ordinary skill in the art that alternative queries and formats can be utilized within the scope of the present disclosure.

As illustrated, the logical query 500 can be a standard ODBC query to obtain access to a set of data. In accordance with an embodiment, the XML message 502 is generated by the BI server and transmitted to the application server hosting the ADF, or to a particular broker that enables this connection. Furthermore, the Bypass SQL 504 returned to the BI server includes the SQL generated by the composite view object 506.

In accordance with various embodiments, when using SQL Bypass, the BI server can rewrite and re-plan the query before executing it against the database. Query plans or query execution plans are well known in the art of computed data access and are frequently used to optimize the way a query will be executed against the database. Since SQL queries are declarative, there are typically multiple alternative ways to execute a given query, where each of those ways yields a different performance (latency, etc). Query optimizers or planners usually aim to provide an optimal way to execute the query so as to provide the best performance. It is noted that there are many techniques to plan or re-plan a query and that no single technique is intended to be limiting to this disclosure. For example, in accordance with one embodiment, the query is replanned to push down aggregations so that they are executed in the database. In accordance with other embodiments, the query is replanned in other ways in order to improve performance.

Figure 6:
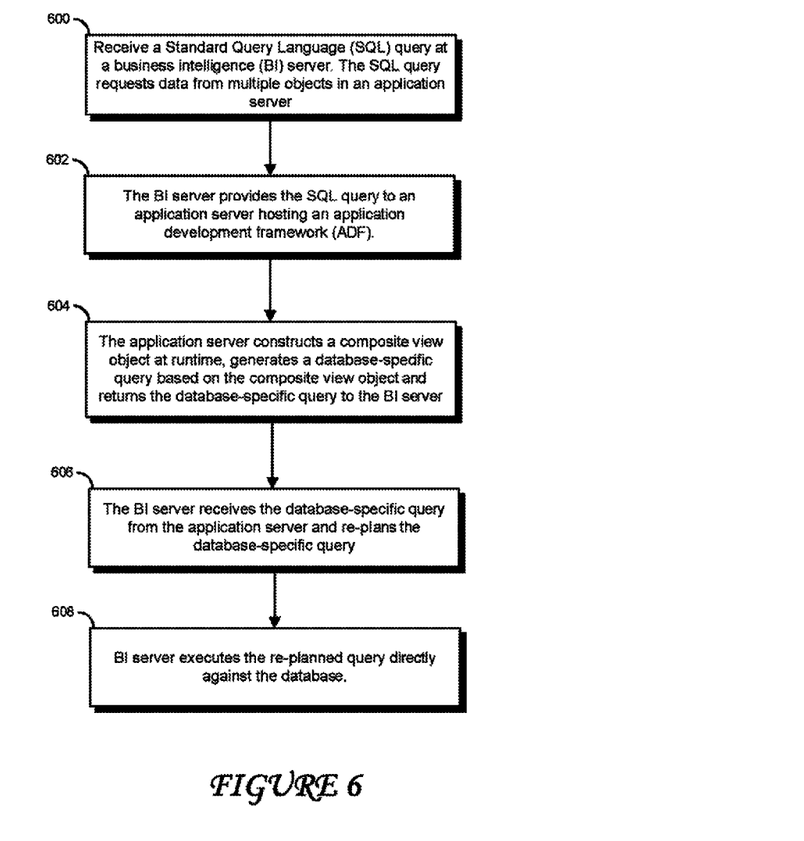
FIG. 6 is a flow chart diagram of performing an SQL bypass and generating composite VO object, in accordance with various embodiments of the invention.

FIG. 6 is a flow chart diagram of performing an SQL bypass and generating composite VO object, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 600, the BI server can receive a Structured Query Language (SQL) query from a client. In accordance with an embodiment, the SQL query can request data from multiple objects in an application server. In step 602, the BI server provides the SQL query to an application server hosting an application development framework (ADF). In accordance with an embodiment, the BI server can generate an XML message that describes the SQL query and transmits the XML message to the application server or a broker agent in communication with the application server. In step 604, once the application server receives the XML message, it constructs a composite view object at runtime, generates a database-specific query based on the composite view object and returns the database-specific query to the BI server. In step 606, the BI server receives the database-specific query from the application server and re-plans the database-specific query. In accordance with an embodiment, the query can be replanned to push down aggregations. In step 608, the BI server executes the re-planned query directly against the database.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions. In one embodiment, the computer readable storage medium is non-transitory.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention.

What is claimed is:

1. A method for performing queries in a business intelligence server environment, said method comprising:
   receiving, at a business intelligence (BI) server, a Structured Query Language (SQL) query that accesses data from a plurality of objects in an application server;
   determining, via the BI server, that a SQL bypass is to be performed, and performing the additional steps of:
      transmitting an extensible markup language (XML) representation of the SQL query to the application server, wherein the application server operates to construct a composite view object from the plurality of objects, and generate a database-specific query based on the composite view object, and return the database-specific query to the BI server,
   receiving the database-specific query from the application server,
   re-planning the database-specific query wherein the re-planned query causes the BI server to invoke one or more functionalities which further cause one or more computations to be performed at a database instead of at the BI server, and
   executing the re-planned database-specific query directly against the database.

2. The method of claim 1, further comprising:
performing a writeback of data through the business intelligence (BI) server front end while respecting business logic defined in an application layer at the application server.

3. The method of claim 1, wherein the application server further includes:
   a business intelligence (BI) shared library that enables the BI server to communicate with the application server over hyper text transfer protocol (HTTP).

4. The method of claim 1, wherein the application server further includes:
   an application developer framework (ADF) shared library that generates the database-specific query.

5. The method of claim 1, wherein the BI server further includes a presentation layer, a logical layer and a physical layer.

6. The method of claim 5, wherein the physical layer of the BI server directly models the view object structure in the application server.

7. The method of claim 1, wherein the SQL query received at the BI server includes a summation computation.

8. The method of claim 7, wherein as a result of the SQL bypass, the summation computation is performed directly at the database end, before streaming the results back to the BI server.

9. The method of claim 1, wherein to construct the composite view object, a set of constituent view objects used in the query are first topologically sorted by inferring the ordering of the constituent view objects from a set of view links between said constituent view objects.

10. A system for performing queries in a business intelligence server environment, said system comprising:
   one or more microprocessors;
   an application server running on the one or more microprocessors;
   a business intelligence (BI) server that is configured to receive a Structured Query Language (SQL) query, determine that a SQL bypass is to be performed and perform the additional steps of:
  providing an extensible markup language (XML) representation of the SQL query to the application server, wherein the application server operates to construct a composite view object from the plurality of objects, and generate a database-specific query based on the composite view object, and return the database-specific query to the BI server;
  receiving the database-specific query from the application server,
  replanning the database-specific wherein the re-planned query causes the BI server to invoke one or more functionalities which further cause one or more computations to be performed at a database instead of at the BI serve, and
  executing the re-planned database-specific query directly against said database.

11. The system of claim 10, wherein the BI server further performs a writeback of data through the business intelligence (BI) server frontend while respecting the business logic defined in the application server.

12. The system of claim 10, wherein the application server further includes:
  a business intelligence (BI) shared library that enables the BI server to communicate with the ADF over hyper text transfer protocol (HTTP).

13. The system of claim 10, wherein the application server further includes:
  an application developer framework (ADF) shared library that generates the database-specific query.

14. The system of claim 10, wherein the BI server further includes a presentation layer, a logical layer and a physical layer.

15. The system of claim 14, wherein the physical layer of the BI server directly models the view object structure in the application server.

16. The system of claim 10, wherein the SQL query received at the BI server includes a summation computation.

17. The system of claim 10, wherein as a result of the SQL bypass, the summation computation is performed directly at the database end, before streaming the results back to the BI server.

18. The system of claim 10, wherein to construct the composite view object, a set of constituent view objects used in the query are first topologically sorted by inferring the ordering of the constituent view objects from a set of view links between said constituent view objects.

19. A non-transitory computer-readable storage medium storing one or more sequences of instructions for performing queries, which instructions, when executed by one or more processors, cause the one or more processors to carry out the steps comprising:
  receiving, at a business intelligence (BI) server, a Structured Query Language (SQL) query that accesses data from a plurality of objects in an application server;
  determining, via the BI server, that a SQL bypass is to be performed, and performing the additional steps of:
    transmitting an extensible markup language (XML) representation of the SQL query to the application server, wherein the application server operates to construct a composite view object from the plurality of objects, and generate a database-specific query based on the composite view object, and return the database-specific query to the BI server,
    receiving the database-specific query from the application server,
    re-planning the database-specific query wherein the re-planned query causes the BI server to invoke one or more functionalities which further cause one or more computations to be performed at a database instead of at the BI server, and
    executing the re-planned database-specific query directly against the database.

20. The non-transitory computer-readable storage medium of claim 19, wherein the SQL query received at the BI server includes a summation computation, and wherein as a result of the SQL bypass, the summation computation is performed directly at the database end, before streaming the results back to the BI server.

* * * * *

UNITED STATES PATENT AND TRADEMARK OFFICE
CERTIFICATE OF CORRECTION

| | | |
|---|---|---|
| PATENT NO. | : 8,868,588 B2 | Page 1 of 1 |
| APPLICATION NO. | : 13/100263 | |
| DATED | : October 21, 2014 | |
| INVENTOR(S) | : Mascarenhas et al. | |

It is certified that error appears in the above-identified patent and that said Letters Patent is hereby corrected as shown below:

In the claims

In column 8, line 18, in Claim 1, before "generate" delete "and".

Signed and Sealed this
Sixteenth Day of February, 2016

Michelle K. Lee
*Director of the United States Patent and Trademark Office*